United States Patent [19]

Nakamura

[11] Patent Number: 4,635,398

[45] Date of Patent: Jan. 13, 1987

[54] WATERTIGHT WINDOW ASSEMBLY

[75] Inventor: Shunichi Nakamura, Anjo, Japan

[73] Assignee: Aisin Seiki Kabushiki Kaisha, Karya, Japan

[21] Appl. No.: 715,419

[22] Filed: Mar. 25, 1985

[30] Foreign Application Priority Data

Mar. 27, 1984 [JP] Japan .......................... 59-044717[U]

[51] Int. Cl.$^4$ ............................................... E06B 3/32
[52] U.S. Cl. ...................................... 49/413; 49/370; 49/440; 49/490
[58] Field of Search ................. 49/413, 431, 434, 438, 49/439, 440, 444, 370, 404, 490, 485, 486

[56] References Cited

U.S. PATENT DOCUMENTS 4,124,054 11/1978 Spretnjak .............................. 49/413
4,490,942 1/1985 Arnheim ................................ 49/374

FOREIGN PATENT DOCUMENTS 627491 5/1963 Belgium ................................ 49/486
944269 12/1963 United Kingdom ................. 49/485

Primary Examiner—William E. Lyddane
Assistant Examiner—Gerald A. Anderson
Attorney, Agent, or Firm—Finnegan, Henderson, Farabow, Garrett and Dunner

[57] ABSTRACT

A watertight window assembly adapted to be mounted in an automobile comprises a window frame, two sliding panes, weather strips which are mounted in a guide groove formed in the frame and which abut on the panes in a watertight manner, frame members mounted to the opposite ends of the panes, and a seal member of a resilient material. The seal member is mounted to one of the frame members and abuts on the other in a watertight manner. The end portions of the frame members and of the seal member are received in the weather strips. The portions of the frame members which bear on the weather strips are inclined to the direction in which the panes slide. These inclined portions face the panes.

8 Claims, 7 Drawing Figures

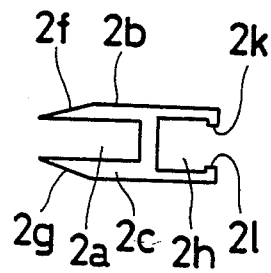
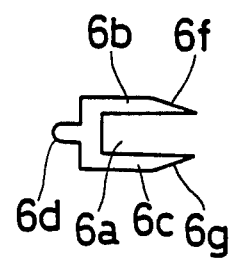
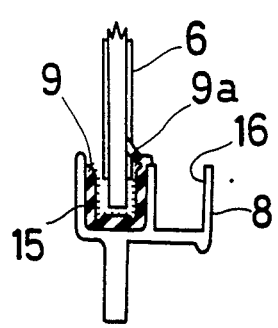
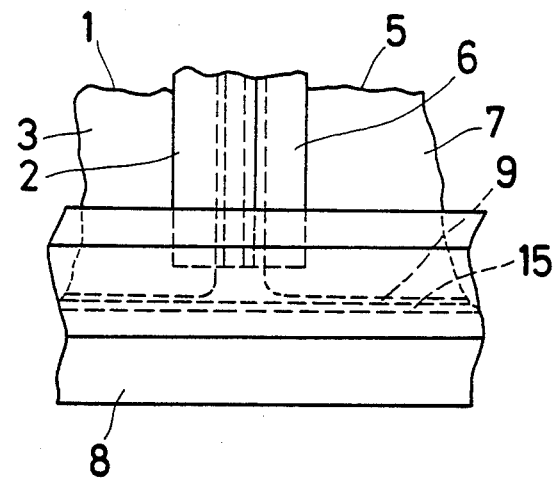

WATERTIGHT WINDOW ASSEMBLY

FIELD OF THE INVENTION

The present invention relates to a watertight window assembly adapted for houses and vehicles, especially for automobiles.

BACKGROUND OF THE INVENTION

A window assembly of this kind has been disclosed in U.S. Pat. No. 4,158,272, where a window frame forms a window opening. A guide channel extends along the frame above and below the frame. Two glass panels are directly fitted in the channel so as to be slidable, in order that the window opening is opened and closed by the panels. Accordingly, the window assembly of this kind needs only one such guide channel. Further, window glasses are used as the sliding panels. Hence, this window assembly is economical to manufacture. To make the window assembly watertight, weather strips are mounted between the window frame and the panes on each lateral side of the frame such that the strips bear on the panes in a watertight manner. Also, weather strips are fitted in the guide channel in such a way that they abut against the panes in a watertight manner. Frame members are mounted to opposite ends of the panes. A watertight member which bears on one of the frame members is mounted to at least the other frame member, to secure watertightness when the window opening is closed.

If the frame members were allowed to make close contact with the weather strips, the frame members would protrude beyond the surface of the panes because of the spaces in which they are mounted. Thus, the panes would experience a large resistance when slid, whereby the panes would become less easy to open and close. Therefore, in order to avoid this undesirable situation, the end portions of the frame members and of the watertight member are located outside the weather strips, creating air gaps between the end portions of the frame members and of the watertight member and the weather strips. This prevents the problem that rainwater, dust, or other foreign matter intrudes into the vehicle through the gaps when the window opening is closed.

SUMMARY OF THE INVENTION

In view of the foregoing problem with the conventional structure, it is the main object of the present invention to provide a window assembly which exhibits an improved watertightness when the opening is closed, and the panes of which are no more cumbersome to slide for opening or closing the window opening than conventional.

It is another object of the invention to provide a watertight window assembly which includes two sliding glass panels directly inserted in a guide groove so as to be slidable for opening or closing the window opening, and which exhibits an improved watertightness.

These objects are achieved by a watertight window assembly comprising glass panels, two frame members, a watertight member, and weather strips, the end portions of the frame members and of the watertight member being received in the weather strips, at least the portions of the frame members on which the weather strips bear being surfaces that are inclined to the direction in which the glass panels slide, the surfaces facing the panels.

In the above watertight assembly, at least the portions of the frame members on which the weather strips bear are the surfaces that are inclined to the direction in which the panels slide, the surfaces facing the panels. Therefore, the resistance of the weather strips against the sliding frame members is not so large. Hence, the window can be opened and closed with the same ease as conventional, because the end portions of the frame members and of the watertight member are received in the weather strips. Additionally, for the same reason, no gaps exist between the end portions of the frame members and of the watertight member and the weather strips, thus enhancing the watertightness when the window is closed.

In the novel watertight window assembly, at least the portions of the frame members on which the weather strip bear are the surfaces that are inclined to the direction in which the panels slide and these surfaces face the panels. Thus, the frame members and the panels are kept in abutment with the weather strips in such a way that the panels do not move away from their respective frame members. This prevents intrusion of rainwater or other foreign matter into the weather strips through tne vicinities of the locations at which the panels bear on the strips when the window is closed, thus adding to the watertightness. That the resistance of the weather strips against the sliding frame members is not large contributes to improved durability of the strips. Furthermore, the appearance of the assembly is improved due to the fact that the end portions of the frame members and of the watertight members are received in the weather strips, i.e., in the guide groove.

Other objects and features of the invention will appear in the course of the description that follows.

BRIEF DESCRIPTION OF THE DRAWINGS

FIGS. 4 and 5 are plan views of frame members;

FIG. 6 cross-sectional view taken on the line VI—VI of FIG. 2; and

FIG. 7 is a fragmentary front elevation showing the lower end portions of the glass panels shown in FIG. 2.

DETAILED DESCRIPTION OF THE INVENTION

Figure 1:
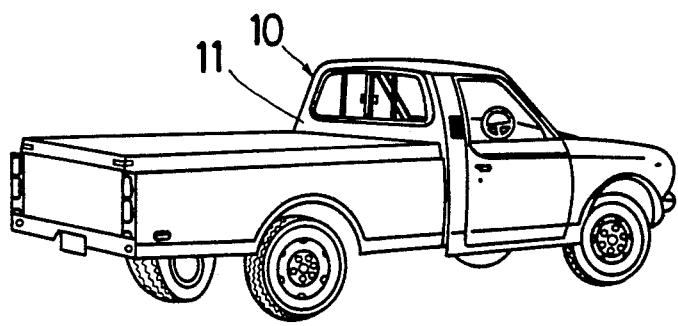
FIG. 1 is a perspective view of a pickup truck in which a watertight window assembly according to the present invention is installed.
Figure 2:
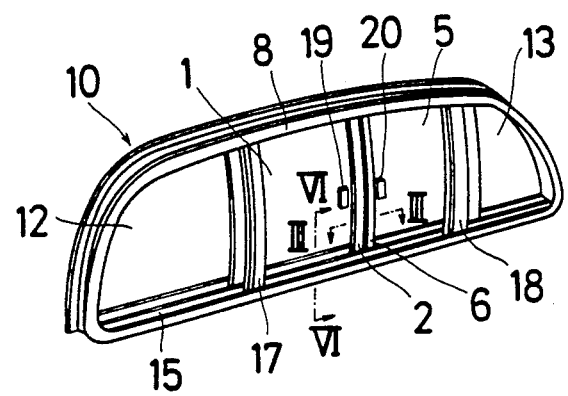
FIG. 2 a perspective view of the watertight window assembly shown in FIG. 1.

Referring to FIG. 1, there is shown a window assembly 10 embodying the concept of the present invention. This assembly 10 is mounted on the rear side of the cab of a pickup truck, for example. As shown in FIG. 2, the window assembly 10 is composed of a window frame 8 mounted to the body 11 of the truck, fixed glass panels 12 and 13 on both sides within the frame 8, and two sliding glass panels 1 and 5. The panels 1 and 5 are mounted to the frame 8 so as to be slidable. Thus, the sliding panels 1 and 5 can open and close the opening formed between the fixed panels 12 and 13. The sliding panels 1 and 5 consist of panes 3 and 7 and frame members 2 and 6, respectively, which are located on the opposite fringes of the panes 3 and 7.

Referring next to FIG. 6, there is shown the lower portion of the window frame 8. This lower portion is provided with a retaining channel 16 in which the panels 12 and 13 are fitted and held on the outside of the cab, and also with a single guide channel 15 in which the two sliding panels 1 and 5 are slidably retained on the inner side of the cab. Likewise, the upper portion of the frame 8 is provided with similar retaining and guide channels. The guide groove 15 extends to the positions at which the fixed panels 12 and 13 are secured. When the sliding panels 1 and 5 are placed on the side of the fixed panels 12 and 13, the opening formed between the panels 12 and 13 is opened.

As shown in FIG. 2, frame members 17 and 18 are disposed at the open ends of the fixed panels 12 and 13. Weather strips (not shown) which extend vertically are mounted to the frame members 17 and 18. When the window is closed, the weather strips come into abutting engagement with the outer surfaces of the panes 3 and 7 of the sliding panels 1 and 5 in a watertight manner. As shown in FIG. 6, a weather strip 9 which assumes a U-shaped form in cross section is disposed in the guide channel 15. The weather strips 9 have lips 9a which abut against the upper and lower fringes of the sliding panels 1 and 5, or the panes 3 and 7, in a watertight manner. To reduce the frictional force produced between each weather strip 9 and the sliding panel 1 or 5, hair is planted in each weather strip 9.

Figure 3:
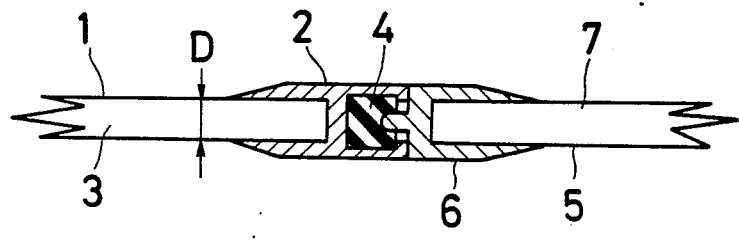
FIG. 3 is a cross-sectional view taken on the line III—III of FIG. 2.

As shown in FIG. 3, the frame members 2 and 6 are secured to the front ends of the panes 3 and 7. As shown in FIGS. 4 and 5, the frame members 2 and 6 have legs 2b, 2c and 6b, 6c, respectively, and take a U-shaped form in cross section. The legs 2b and 2c form a groove 2a in which the front end of the pane 3 is fitted. Similarly, the legs 6b and 6c form a groove 6a in which the front end of the pane 7 is fitted. The width of the rear portions of the grooves 2a and 6a is made slightly larger than the thickness D of the panes 3 and 7 and the width of the front portions is made slightly smaller than the thickness D, in order that the front ends of the panes 3 and 7 are held between the legs 2b and 2c and between the legs 6b and 6c, respectively.

To permit the frame members 2 and 6 to engage with each other when the window is closed, the frame member 2 is provided with a groove 2h, and the other frame member 6 has a protrusion 6d engaging the groove 2h. This groove 2h is open on the side of the frame member 6, and takes a C-shaped form in cross section. A seal member 4 made of a resilient material is mounted in the groove 2h in the frame 2, and is held by protrusions 2k and 2l formed on the front end of the groove 2h. Thus, when the window is closed, the protrusion 6d on the frame member 6 is upwardly and downwardly pressed on the seal member 4 that is retained in the frame member 2, thus securing the watertightness between the opposite front ends of the sliding panels 1 and 5. The front end of the protrusion 6d is rounded so as not to damage the seal member 4.

As shown in FIG. 7, the upper and lower end portions (only the lower end portions are shown in FIG. 7) of the frame members 2 and 6 and of the seal member 4 are received in the guide grooves 15 on the upper and lower sides of the window frame 8. As such, these end portions of the frame members 2, 6 and of the seal member 4 are located within the weather strips 9 to thereby ensure the watertightness between the opposite front fringes of the sliding panels 1 and 5.

The legs 2b and 2c of the frame member 2 have surfaces 2f and 2g, respectively, on their front ends. These surfaces 2f and 2g are inclined to the direction in which the pane 3 slides, face on the pane 3, and form edges. Similarly, the legs 6b and 6c of the frame member 6 have surfaces 6f and 6g, respectively, on their front ends. These surfaces 6f and 6g are inclined to the direction in which the pane 7 slides, face on the pane 7, and form edges. Therefore, even if the legs 2b, 2c and 6b, 6c of the frame members 2 and 6 protrude from the panes 3 and 7, respectively, the weather strips 9 substantially uniformly make close contact with the panes 3, 7 and the frame members 2, 6, because the surfaces on which the weather strips 9, especially their lips 9a, bear are continuously formed. Hence, even if the upper and lower end portions of the frame members 2, 6 and of the seal member 4 are received in the weather strips 9, the resistance that the weather strips 9 exhibit when the panes 3 and 7 slide on the strips 9 will not greatly increase. Consequently, the sliding panels 1 and 5 can be opened and closed with sufficient ease.

Further, the weather strips 9 continuously make close contact with the panes 3 and 7 and with the frame members 2 and 6, and therefore they prevent intrusion of rainwater or other foreign matter into the weather strips through the vicinities of the locations at which the panes 3 and 7 bear on the weather strips when the window is closed. In this way, the watertightness is further enhanced. Additionally, since the resistance of the weather strips 9 against the sliding frame members 2 and 6 is not large, the weather strips 9 is durable. Furthermore, the end portions of the frame members 2, 6 and of the seal member 4 are received in the weather strips 9, i.e., in the guide grooves 15, thus improving the appearance.

When the window is closed, the panes 3 and 7 are locked securely to each other by brackets 19 and 20 which are directly fixed to the pane members 3 and 7, respectively. This avoids the bulkiness of the frame members 2 and 6 and does not require that these two members have a large mechanical strength. Therefore, the frame members 2 and 6 can be made from an aluminum alloy by extrusion or made from a hard resin, in which case they can be easily shaped into thin-walled members. The frame members 2 and 6 can be bonded to the panes 1 and 7, respectively, with adhesive. In bonding the members 2 and 6 to the panes, the frame members 2 and 6 are placed in the grooves 2a and 6a, respectively, before window glasses are fitted in the grooves 2a and 6a. Since the width of the grooves 2a and 6a becomes smaller toward the front end, the adhesive used will not be emitted onto the surface of the window glasses, whereby the appearance is improved.

What is claimed is:

1. A watertight window assembly, comprising:
a window frame forming a window opening;
a single guide groove formed in the frame along spaced opposing edges of said opening;
two panes, each having an inner and outer surface, slidably mounted in said groove, said panes being slidable outwardly away from one another to open and inwardly toward one another to close the opening;
a weather strip mounted in the quide groove and abutting on said outer surface of the panes to form a watertight joint between said outer surface and said weather strip;

a frame member mounted on opposing ends of each of the panes, each said frame member having first spaced portions engaging said inner and outer surfaces and extending outwardly a predetermined distance to form an edge spaced from and along each said opposing end, one said frame member having second spaced portions extending inwardly a predetermined distance from the respective opposing end of said panes, another of said frame members having an inwardly extending portion dimensioned to fit between said spaced second portions of said one frame member, when said panes close the opening, each said frame member extending in a direction substantially perpendicular to said guide groove through the watertight joint between said outer surface and said weatherstrip, each said frame member having an inclined plane surface portion in said joint between said outer surface of the pane and said weather strip, said inclined plane surface portion extending outwardly to said edge of each frame member; and a watertight member disposed between the spaced extensions of said one frame member for abutting said inwardly extending portion of said other frame member to form a watertight joint when said panes close the opening.

2. The watertight window assembly of claim 1, wherein said inwardly extending portion of said other frame member is a protrusion positioned to be pressed against said watertight member when said panes close the opening.

3. The watertight window assembly of claim 2, wherein said protrusion has a rounded end.

4. The watertight window assembly of claim 1, wherein said first spaced portions of each of the frame members are U-shaped in cross section, and wherein said opposing ends of the panes are held by said U-shaped portion.

5. The watertight window assembly of claim 1, wherein each of said frame members is identical in width to provide flush surfaces when said panes close the opening.

6. The watertight window assembly of claim 5, wherein the periphery of said frame members are substantially symetrical in cross section when said panes close the opening.

7. The watertight window assembly of claim 4, wherein said spaced second portions of said one frame member are C-shaped in cross section and wherein said watertight member is retained within said spaced seocnd portions.

8. A watertight window assembly according to claim 1 further comprising a bracket fixed to said inner surface of each said pane for manually sliding a corresponding pane between an open and a closed position respectively, said brackets each being positioned outwardly of said frame members and intermediate spaced opposing edges of said groove.

* * * * *